Sept. 4, 1923.

H. ROWNTREE 1,466,758

SAFETY LOCK MECHANISM FOR AUTOMOBILES

Filed April 2, 1920

H. ROWNTREE

1,466,758

SAFETY LOCK MECHANISM FOR AUTOMOBILES

Filed April 2, 1920 4 Sheets-Sheet 2

Sept. 4, 1923.  1,466,758
H. ROWNTREE
SAFETY LOCK MECHANISM FOR AUTOMOBILES
Filed April 2, 1920  4 Sheets-Sheet 3

Patented Sept. 4, 1923.

1,466,758

UNITED STATES PATENT OFFICE.

HAROLD ROWNTREE, OF KENILWORTH, ILLINOIS, ASSIGNOR TO NATIONAL PNEUMATIC COMPANY, OF NEW YORK, N. Y., A CORPORATION OF WEST VIRGINIA.

SAFETY-LOCK MECHANISM FOR AUTOMOBILES.

Application filed April 2, 1920. Serial No. 370,824.

*To all whom it may concern:*

Be it known that I, HAROLD ROWNTREE, a citizen of the United States, residing at Kenilworth, county of Cook, State of Illinois, have made a certain new and useful Invention in Safety-Lock Mechanism for Automobiles, of which the following is a specification.

This invention relates to safety lock mechanism for automobiles.

The object of the invention is to provide a safety lock mechanism for automobiles and other purposes which is simple in construction, and efficient in operation.

A further object is to provide a safety lock mechanism which is both manually and automatically controlled.

A further object is to provide a safety lock mechanism of the nature referred to which is actuated automatically to effect its locking function in case the chauffeur, driver or other attendant neglects or fails to properly observe the necessary precautions.

A further object is to provide a combined manual and automatic control of safety lock mechanism for automobiles and other purposes.

A further object is to provide a safety lock mechanism of the nature referred to which is combined with the usual control devices of the ignition or lighting systems of the automobile.

A further object is to provide a combined manual and automatic control of safety lock mechanism for automobiles and other purposes wherein the automatic control may be rendered ineffective whenever desired.

A further object is to provide a combined manual and automatic control of safety lock mechanism for automobiles wherein the automatic control is effected through the opening of a door of the automobile.

Other objects of the invention will appear more fully hereinafter.

The invention consists substantially in the construction, combination, location and relative arrangement of parts, all as will be more fully hereinafter set forth, as shown in the accompanying drawings, and finally pointed out in the appended claims.

Referring to the drawings:—

The same part is designated by the same reference character wherever it occurs throughout the several views.

Many different kinds of automobile locks have been proposed with a view to preventing unauthorized use or theft of the machine, and wherein one part or another of the mechanism of the car required to be operated to start the car has been locked. In many cases of automobile locks at present on the market, the driver of the car is required to perform some act to effect the locking operation before he leaves the car. It sometimes happens, however, that the driver or chauffer leaves the car and forgets or neglects to lock the car, or else, intending and expecting to leave the car only for a brief period of time, is detained for a longer period during which the car is left unlocked and liable to be taken or stolen. These are some of the defects to many of the forms of automobile locking devices at present on the market and which I propose to avoid in locking devices embodying the principles of my present invention.

In accordance with my invention I propose to employ the locking device or arrangement which is controllable not only manually but also automatically, the automatic part becoming effective in case the chauffeur, driver, or other attendant, fails or neglects to observe the proper precautions before or on leaving the car. I also propose to provide means whereby the safety lock embodying my invention may be applied, if desired, in combination with the usual or ordinary control devices for the starting, lighting or ignition systems of the car, and for the purpose of controlling the switch through which current is supplied to the ignition system of the car. It is to be understood, however, that the application of a safety lock mechanism embodying my invention to the switch which controls the circuit of the ignition system is only illustrative of the principles involved and my invention is not to be limited or restricted to such application since it is equally well adapted for use in locking any other part or mechanism of the car which is required to be operated in order to start the car, or to any other part concerned in the operation of the car.

As illustrative of one practical embodiment of my invention I have shown it as applied to the switch which controls the ignition circuit. Referring to the drawings, 14 designates a casing within or upon which are mounted the various switches concerned in the circuit control of a well known type of lighting or starting system. Mounted within this casing are the usual switch devices 15 and star wheels 16 and spring pressed equalizing stop bar 17, acted upon by the spring 18 and carying the star wheel stop rollers 19. All of these parts are of the usual and ordinary structure and in the specific structure and arrangement thereof constitute no part of my present invention except as hereinafter set forth.

Mounted upon bracket arms 20 secured to the insulating member 21 constituting the rear wall of the casing 14 is a magnet indicated generally at 22, and hereinafter to be more particularly described. Suitably connected to a stem portion 23 of the movable armature or core 24 of the magnet is one end of a lever 25, which is pivotally mounted intermediate its ends as at 26, see Fig. 6, upon the member 21 of the casing. The other end of said lever extends through an opening in the casing member or wall 21, and is engaged in a plate 27, mounted to slide upon the inner face of the wall 21. A spring 28 is arranged to normally exert its tension upon the magnet core and lever 25 to withdraw the magnet core from the magnet coil and to rock the inner end of the lever upwardly to raise the slide plate 27. This slide plate may be guided in its movement in any suitable manner. A simple arrangement is shown wherein screws 29 fastened to the the inner face of wall 21, work through slots 30 in the slide-plate. The plate 27 may be steadied in its sliding movements in any simple manner. A convenient arrangement is shown wherein a friction plate 31 is held to the face of the slide plate 27 by the guiding screws 29. This friction plate is formed with spring fingers 32, which bear upon the face of plate 27 and impose thereon a frictional resistance.

Figures 5, 6, 7:
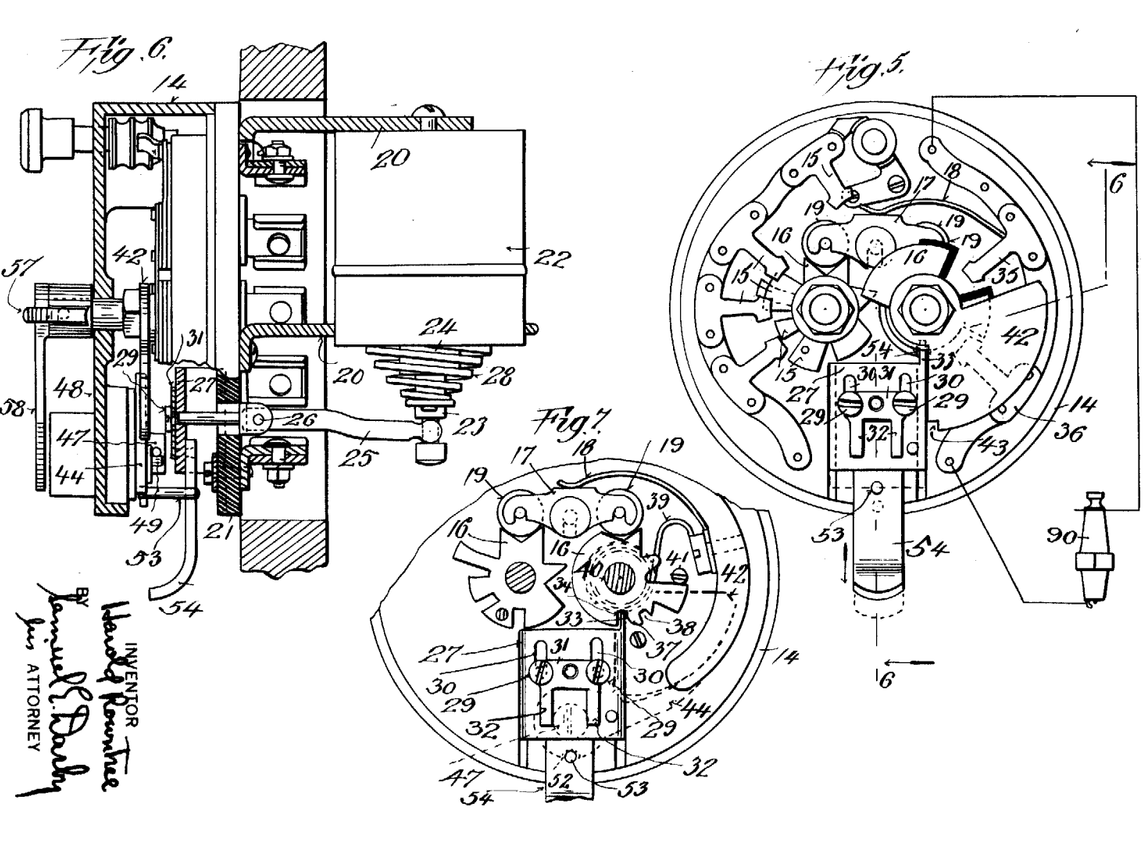
Fig. 5 is a view in front elevation of the combined locking and circuit control systems, with the front face plate of the containing casing removed.
Fig. 6 is a broken view in section on the line 6—6 of Fig. 5, looking in the direction of the arrows.
Fig. 7 is a broken detail view of a portion of the safety lock and lighting or ignition circuit control switches.

The slide plate 27 is formed with a lug or extension 33, at its upper edge which cooperates with one of the star wheels 16 to form a releasable lock stop therefor. In practice, in one mode of application of my invention, I propose to associate the locking invention, I propose to associate the locking slide 27 and its lug 33 with that star wheel 16 which controls the ignition circuit of the engine, and I also propose to employ such an association of the plate and lug with the star wheel as to secure a trigger cocking action, whereby an efficient release of the star wheel is secured when the parts are to be restored to inoperative relation after being locked out of such relation. To accomplish this result, in one practical embodiment of the idea, a recess 34 is formed in the periphery of the star wheel 16, in which the lug 33 is received and held when the parts occupy their normal positions for cutting out the ignition circuit of the motor. The star wheel 16 is yieldingly retained in this position by the action of the spring 18, equalizer bar 17, and roller 19, the latter engaging in a suitable seat or recess in the peripheral surface of the star wheel. While in this position circuit is open at the contacts 35, 36, of the ignition system, which circuit includes the spark plug indicated at 90, Fig. 5. The slide plate 27 is yieldingly held in its position with its lug 33, engaged in recess 34, by means of the spring 28 acting upon lever 25. When the star wheel 16 is thrown into position to complete the ignition circuit at contacts 35, 36, in order to secure the trigger or cocking action referred to, it is desirable that the lug 33 ride easily and smoothly out of the recess 34, the slide plate 27, being depressed against the tension of spring 28, to permit this movement. To accomplish this the wall 37 of the slot 34, see Fig. 7, is rounded off, and a second seat or recess 38 is formed in the periphery of the star wheel 16, into which the lug 33 snaps when the star wheel reaches its position to complete the ignition circuit at 35, 36, which is the position of the parts when the motor is to be operated. The displacement of the star wheel from the position thereof shown in Fig. 7 into a position for the lug 33 to snap into recess or seat 38, is accomplished against the tension of spring 18 exerted through the equalizer bar 17, and an auxiliary retractile spring 39, which is connected to the stem 40 of the star wheel. The tensions of these springs normally operate to restore the star wheel to the position shown in Fig. 7 when the lug 33 is released from its engagement with recess or seat 38. This release is effected by the energization of magnet 22, which causes the lever 25 to be rocked so as to withdraw the slide plate 27, or the lug 33 carried thereby from engagement in the seat or recess 38. The control of the circuit of magnet 22 will be more fully explained hereinafter. The return movement of the star wheel into "off" position may be arrested in any suitable manner. A stop 41 is shown in Fig. 7 for this purpose.

Mounted upon, to rock with the stud 40, which carries the star wheel 16, is a sector plate 42, which is formed with a notch 43, at one corner of the peripheral edge thereof. Arranged to bear against the peripheral edge of sector plate 42 is a sector arm 44, see Figs. 8 and 13, which is yieldingly pressed to engagement with the sector plate in any suitable manner, as, for example, by means of a spring 45. The sector arm is formed with a shoulder 46 which engages the notch 43 in the sector plate 42 when the latter is shifted into position corresponding to the "off" or open position of the star wheel 16. The sector arm 44 is loosely mounted on the stem 47 of a lock tumbler mounted upon the front plate 48 of the casing 14. This arm 44 carries a stud 49 which is engaged by a pin 50 extended transversely through the tumbler stem 47. A wear plate or washer ring 51 is interposed between the pin 50 and the face of the arm 44, and this washer ring is slotted for the stud 49 to extend therethrough. The peripheral edge of the hub portion of sector arm 44 is formed with a depression or seat 52 which is designed to receive a pin 53, carried by an extension member 54, of slide plate 27. The tumbler stem 47 is adapted to be turned to release the engagement of pin 53 with seat 52 by means of a key 55 inserted into a tumbler 56 extending through the front wall 48 of the casing in the usual manner.

The stem 40 which carries the star wheel 16 and sector plate 42 may be turned to "on" or running position in any suitable or convenient manner. A simple arrangement for the purpose is shown wherein the stem 40 extends through the front or face plate 48 of the casing and on said extending end is mounted an arm 57. Connected to or forming part of the arm 57 is a shield or cover arm 58, which, when the arm 57 is rocked into position to shift the star wheel into "on" or motor running position, forms a cover for the opening 59 in the tumbler which receives the key. Thus it will be seen that so long as the key remains inserted in the key hole of the lock tumbler the arm 47 cannot be operated to shift the star wheel into its "on" or motor running position, and so long as the star wheel is in its "on" or motor running position the key hole is covered by the shield plate member 58 and hence a key cannot be inserted to release the segment arm 44 from its retaining engagement with the sector plate 42.

The operation of the structure so far described is as follows, assuming that the parts are in the position occupied thereby when the motor is not in running condition, as indicated, for example, in Figs. 5 or 7. When in this position the keyhole shield plate 58 uncovers the keyhole slot. The lug 33 is engaged in the seat or recess 34, of the star wheel. The motor ignition circuit is open at contacts 35, 36. The sector arm 44 is in detaining engagement with the sector plate 42. Now, in order to shift the star wheel into "on" or motor running position it is first necessary to insert a key in the tumbler slot 59 and give a slight rotation to the tumbler stem 47, whereupon the pin 50 engages stud 49 and rotarily displaces the sector arm 44, sufficiently for the shoulder 46 thereon to release its engagement with notch 43 in sector plate 42. Then the arm 57 can be depressed to rock the stem 40 and shift the star wheel into "on" or motor running position. This cannot be done, however, until the key has been withdrawn from the keyhole 59. When the star wheel is thus shifted the lug 33 rides over the curved surface 37 of the wall of recess 34 and finally snaps into the recess 38. While the parts occupy these positions a key cannot be inserted in the lock because the shield plate 58 has now attained a position to form a cover for the keyhole. In order to restore the parts to normal "off" position, it is necessary to withdraw the lug 33 from its locking engagement in seat 38 of the star wheel. This is accomplished by completing the circuit of the magnet 22.

Figure 1:
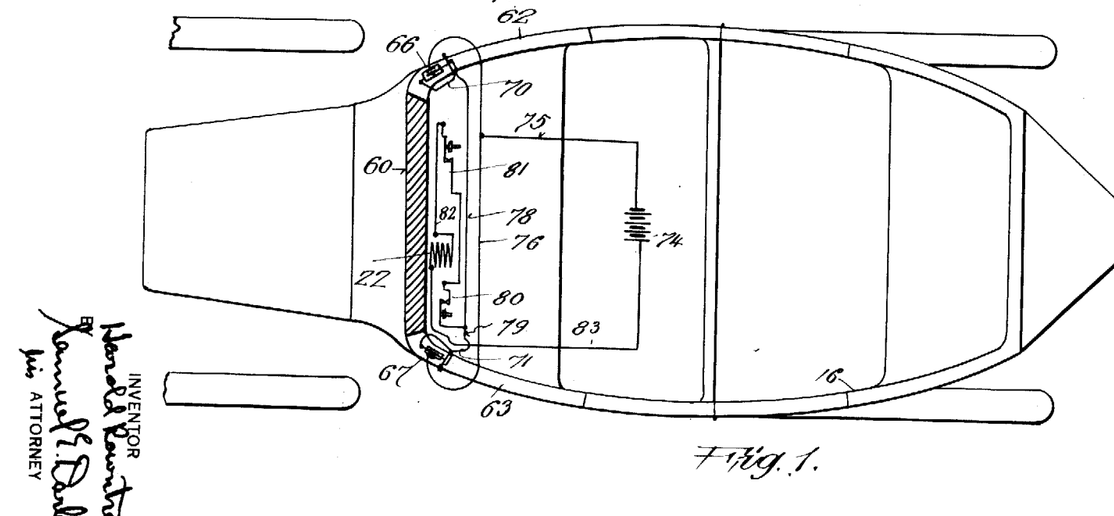
Fig. 1 is a view in top plan, partly diagrammatic, of an automobile showing the application thereto of a safety lock mechanism embodying the principles of my invention.
Figure 2:
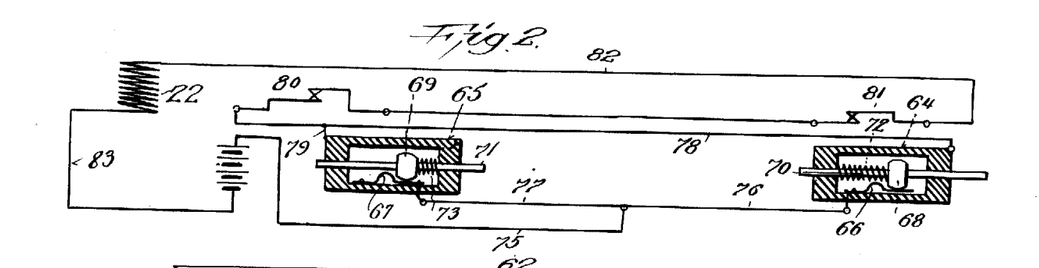
Fig. 2 is a view in diagram of the circuit arrangements embodying the principles of my invention.
Figures 3, 4, 8:
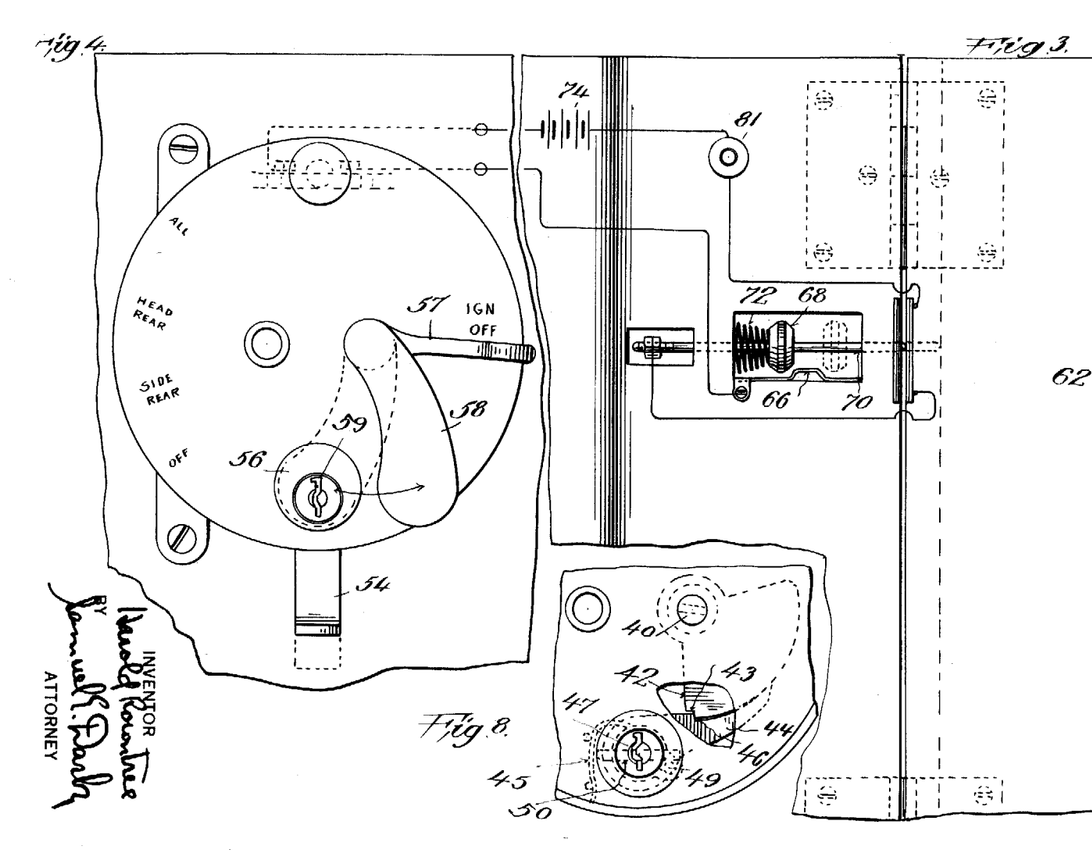
Fig. 3 is a broken view in elevation showing the application of a portion of the safety lock circuit control arrangement embodying my invention as applied to an automobile in position to be operated by a car door, the door being shown in closed position.
Fig. 4 is a broken view in front elevation of a portion of a combined safety lock mechanism and switch structure for controlling the ignition or lighting circuits of an automobile.
Fig. 8 is a broken detail view, parts broken out, showing a portion of the safety lock mechanism.

I will now describe an arrangement of central control circuits for magnet 22, in accordance with the principles of my invention, which I have found to be practical and efficient, particular reference being had to Figs. 1, 2 and 3.

Ordinarily the casing 14 is located upon the dash or cowl board 60 of the automobile and in carrying out my invention in one form of embodiment thereof, I propose to provide means, and I provide means operated by the doors in opening to control the circuits of the magnet 22. I also provide an independent control of the magnet circuits whereby the control of said circuits through the door operation may be rendered ineffective when desired.

For illustrative purposes I have shown the automatic control of these circuits as accomplished by the operation of the two front doors 62, 63, of the automobile. It is to be understood, however, that my invention is not to be limited or restricted in this respect as such automatic control may be easily effected in other ways. In the arrangement shown I mount in each of the door posts or adjacent structures to which the doors are pivoted, an insulating block 64, 65, and in each block I mount a contact strip 66, 67 with which electrical contact is made by a contact member 68, 69, carried in this instance by a rod 70, 71, mounted to slide through the blocks 64, 65. A spring 72, 73, acting upon the rod 70, 71, normally tends to project one end thereof beyond the end of the block and in position to be engaged by the edge of the door, when the door is closed, and forced thereby longitudinally into the block. In the drawing I have shown the position of the rod 71 when the door is closed and that of the rod 70 when the door is open. As the rod is pushed in by the closing of the door an electric circuit is momentarily closed from a battery 74, or other current source through wire 75, wire 76, 77, according to which door is operated to closed position, to contact strip 66, 67, contact member 68, 69, rod 70, 71, wire connection 78, 79, to a safety or manually operated switch 80, 81, wire 82, the coil of magnet 22, and wire 83 back to the other terminal of the battery or other current source 74. Thus it will be seen that the automatic switches associated with the door operations are arranged in parallel, and hence, while I have shown only two of these switch assemblies, one for each front door, I do not desire to be restricted in this respect since parallel circuits are capable of wide application. Likewise the switches 80, 81, are shown in series circuit relation, and therefore, while I have shown only two of such switches I do not desire to be limited in this respect. These manually controlled switches are conviently in the form of push buttons and are located upon the dash or cowl board. When either of the push buttons or switches 80, 81, is operated, the magnet circuit is opened and thereafter, so long as the button or switch remains depressed or operated, the door or doors which automatically control the magnet circuit may be operated without affecting the magnet circuit.

Figures 9, 10, 11, 12, 13:
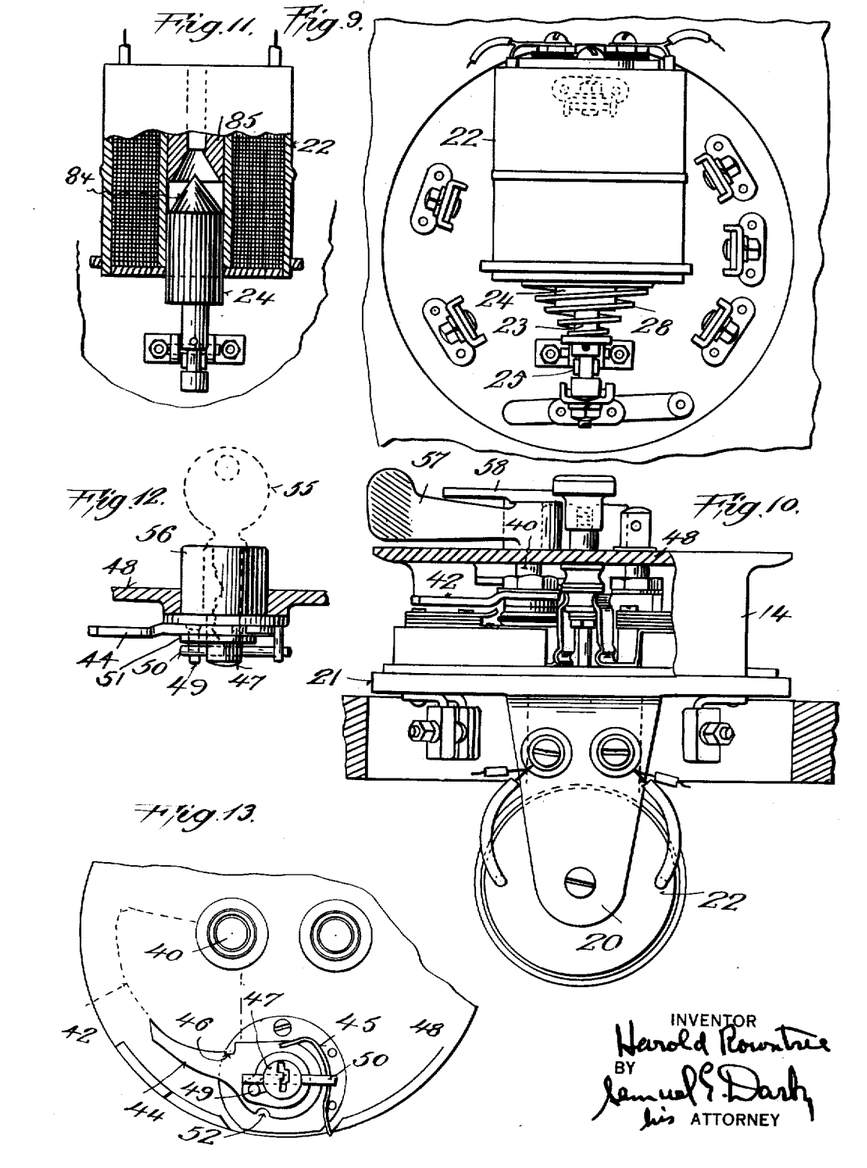
Fig. 9 is a view in side elevation of the construction shown in Fig. 6, looking towards the control magnet.
Fig. 10 is a top plan view of the construction shown in Fig. 9, part of the housing being broken out in section.
Fig. 11 is a broken detail view showing the construction of magnet, its armature and core.
Fig. 12 is a broken detail view showing the arrangement of key control for the locking mechanism.
Fig. 13 is a broken view in rear elevation of the latter.

The magnet structure includes the movable armature or core piece 24 which is shown as cylindrical in form and provided with a pointed end portion 84, see Fig. 11. which cooperates with a correspondingly shaped seat formed in a core piece 85, whereby the attractive force of the magnet upon its movable armature is augmented and a quick sharp strong action is secured when the magnet is energized.

The control of the magnet circuit is effected very simply. When any door of the system is opened, assuming them all to be closed, the circuit of the magnet is closed, thereby causing lever 26 to be actuated to depress the slide 27, thereby withdrawing the lug 33 from locking engagement in the seat or recess 38 in the star wheel and hence permitting said star wheel and its associated contacts to snap back into "off" position. The closing of the magnet circuit is only momentary as the member 68 wipes by contact 66. After the star wheel and its associated contacts snap into "off" position, the circuit of the magnet is opened again by the contact 68 passing beyond the contact 66, and thereupon the spring 28 will restore the slide 27 to raised position with the lug 33 engaging in seat 34, thereby again locking the star wheel in "off" position. Now when the door is closed again the circuit of the magnet is again closed momentarily but the only effect is to withdraw the slide plate 27 and locking lug 33 and then release the same with no resulting change in the operating positions of the parts. After the star wheel reaches its "off" position, it becomes locked in such position by the sector arm 44 engaging the sector plate 42 and hence the insertion of a key in the lock and its operation and then its withdrawal is all necessary before the star wheel can again be actuated to "on" position. Therefore if a driver makes a stop at any place and leaves the car without locking it, the act of opening the door automatically causes the ignition switch to move to "off" position in which position it becomes locked requiring the use of a key to release the same. This result can be avoided, whenever desired, by manipulating one or the other of the manually operated switches 80, 81, to open the magnet circuit, and keeping this circuit open while the door is being opened and closed. It will also be seen that so long as the ignition control switch mechanism is in "on" or motor running condition, a key cannot be inserted in the lock to release the same, and if a key is left in the lock when said switch mechanism is in "off" position, then it will be impossible to actuate the same into "on" position until the key is withdrawn from the lock. Consequently, if the chauffeur or driver neglects or fails to take proper precautions when leaving his car, the act of opening the door to permit him to leave the car will cause the ignition control switch to be actuated to "off" position in which it will be locked, requiring the use of a key to unlock it.

While I have shown my invention as applied to the switch mechanism for controlling the ignition circuits of the motor, and therefore capable of being combined with ordinary makes of motor starting and operating devices it is to be understood that I do not limit or confine myself in this respect as the same may be equally well applied to other devices required to be operated in starting and stopping the car motor or its running or controlling gear.

Having now set forth the objects and nature of my invention, and a construction and arrangement embodying the principles thereof, what I claim as new and useful and of my own invention, and desire to secure by Letters Patent is:—

1. In a safety lock mechanism for automobiles a member for controlling the operation of the automobile, and normally operable into position to permit the operation of the automobile, means for retaining said member in said normal position, and means rendered active by the movement of a member on the automobile to automatically release said retaining means.

2. In a safety lock mechanism for automobiles a member for controlling the operation of the automobile, and normally operable into "on" position, means for retaining said member in its "on" position, means rendered active by the movement of a member on the automobile to automatically release said retaining means, and means to render said automatic releasing means inoperative at will.

3. In a safety lock mechanism for automobiles a member for controlling the operation of the automobile, and normally operable into "on" position, means for retaining said member in its "on" position, means rendered active by the movement of a member on the automobile to automatically release said retaining means, manually controlled means to render the automatic releasing means inoperative at will.

4. In a safety lock mechanism for automobiles a member for controlling the operation of the automobile, and normally operable into "on" position, means for retaining said member in its "on" position, a magnet to release said retaining means, and means rendered active by the movement of a member on the automobile to automatically control the circuit of said magnet.

5. In a safety lock mechanism for automobiles, a member for controlling the operation of the automobile, and normally operable into "on" position, means for retaining said member in its "on" position, a magnet to release said retaining means, means rendered active by the movement of a member on the automobile to automatically control the circuit of said magnet, and means to render the releasing action of said magnet ineffective at will.

6. In a safety lock mechanism for automobiles, a member for controlling the operation of the automobile, and normally operable into "on" position, means for retaining said member in its "on" position, a magnet to release said retaining means, means rendered active by the movement of a member on the automobile to automatically control the circuit of said magnet, and independent manually operated means to control the magnet circuit.

7. In a safety lock mechanism for automobiles a member for controlling the operation of the automobile, and normally operable into "on" position, means for retaining said member in its "on" position, a magnet to release said retaining means, and means controlled by the operation of a door of the automobile for automatically controlling the circuit of said magnet.

8. In a safety lock mechanism for automobiles a member for controlling the operation of the automobile, and manually operable into "on" position, means for retaining said member in its "on" position, and means controlled by the operation of a door of the automobile for automatically releasing said retaining means.

9. In a safety lock mechanism for automobiles a member for controlling the operation of the automobile, and manually operable into "on" position, means for retaining said member in its "on" position, means controlled by the operation of a door of the automobile for automatically releasing said retaining means, and means to permit the operation of the door without releasing the retaining means.

10. In a safety lock mechanism for automobiles a member for controlling the operation of the automobile, and manually operable into "on" position, means for retaining said member in its "on" position, means controlled by the operation of a door of the automobile for automatically releasing said retaining means, and manually operable means to permit the operation of the door without releasing the retaining means.

11. In a safety lock mechanism for automobiles a member for controlling the operation of the automobile, and manually operable into "on" position, means for retaining said member in its "on" position, a magnet to release said retaining means, means controlled by the operation of a door of the automobile for automatically controlling the circuit of said magnet, and means to independently open the circuit of the magnet to permit the operation of the door without releasing the retaining means.

12. In a safety lock mechanism for automobiles a member for controlling the operation of the automobile, and manually operable into "on" position, means for retaining said member in its "on" position, a magnet to release said retaining means, means controlled by the operation of a door of the automobile for automatically controlling the circuit of said magnet, and manually operable means to independently control the circuit of the magnet to permit the door operation without releasing the retaining means.

13. In a safety lock mechanism for automobiles a member for controlling the operation of the automobile, and manually operable into "on" position, means for retaining said member in its "on" position, a magnet to release said retaining means, a circuit for said magnet, a switch arranged in said circuit, and means operated by the movement of a door of the automobile in opening to close said circuit.

14. In a safety lock mechanism for automobiles a member for controlling the operation of the automobile, and manually operable into "on" position, means for retaining said member in its "on" position, a magnet to release said retaining means, a circuit for said magnet, a switch arranged in said circuit, means operated by the movement of a door of the automobile in opening to close said circuit, and independent manually controlled switch also arranged in said circuit, to open the same to permit the opening of the door without releasing said retaining means.

15. In a safety lock mechanism for automobiles, a switch mechanism for controlling the ignition circuit of the automobile motor, said switch mechanism being manually operable into "on" or motor running position, means normally operating to restore said switch mechanism to "off" position, devices to retain said switch mechanism in "on" position, and means to automatically release said devices.

16. In a safety lock mechanism for automobiles, a switch mechanism for controlling the ignition circuit of the automobile motor, said switch mechanism being manually operable into "on" or motor running position, means normally operating to restore said switch mechanism to "off" position, means to retain said switch mechanism in "on" position, means to automatically release said retaining means, and means to render said automatic releasing means inoperative at will.

17. In a safety lock mechanism for automobiles a switch mechanism for controlling the ignition circuit of the automobile motor, said switch mechanism being manually operable into "on" or motor running position, means normally operating to restore said switch mechanism to "off" position, means to retain said switch mechanism in "on" position, and means controlled by the opening of a door of the automobile for releasing said means.

18. In a safety lock mechanism for automobiles a switch mechanism for controlling the ignition circuit of the automobile motor, said switch mechanism being manually operable into "on" or motor running position, means normally operating to restore said switch mechanism to "off" position, means to retain said switch mechanism in "on" position, means controlled by the opening of a door of the automobile for releasing said retaining means, and means to permit the opening of the door without releasing the retaining means.

19. In a safety lock mechanism for automobiles a switch mechanism for controlling the ignition circuit of the automoble motor, said switch mechanism being manually operable into "on" or motor running position, means normally operating to restore said switch mechanism to "off" position, means to retain said switch mechanism in "on" position, a magnet to release said means, a circuit for said magnet, and means to automatically control said circuit.

20. In a safety lock mechanism for automobiles a switch mechanism for controlling the ignition circuit of the automobile motor, said switch mechanism being manually operable in "on" or motor running position, means normally operating to restore said switch mechanism to "off" position, means to retain said switch mechanism in "on" position, a magnet to release said retaining means, a circuit for said magnet, and means to close said circuit by the opening of a door of the automobile.

21. In a safety lock mechanism for automobiles a switch mechanism for controlling the ignition circuit of the automobile motor, said switch mechanism being manually operable into "on" or motor running position, means normally operating to restore said switch mechanism to "off" position, means to retain said switch mechanism in "on" position, a magnet to release said retaining means, a circuit for said magnet, means to close said circuit by the opening of a door of the automobile, and independent manually controlled means to open said circuit to permit the opening of the door without releasing said lock.

22. In a safety lock mechanism for automobiles a member for controlling the operation of the automobile, manually operable into "on" or running position, means normally tending to restore said member to "off" position, a retaining plate associated with said member, a yieldingly pressed slide plate having means to engage said retaining plate when said controlling member is in "on" position, and devices to automatically release said slide plate.

23. In a safety lock mechanism for automobiles a member for controlling the operation of the automobile, manually operable into "on" or running position, means normally tending to restore said member to "off" position, a retaining plate associated with said member, a yieldingly pressed slide plate having means to engage said retaining plate when said controlling member is in "on" position, and devices controlled by the opening of a door of the automobile for automatically releasing said slide plate.

24. In a safety lock mechanism for automobiles a member for controlling the operation of the automobile, manually operable into "on" or running position, means normally tending to restore said member to "off" position, a retaining plate associated with said member, a yieldingly pressed slide plate having means to engage said retaining plate when said controlling member is in "on" position, devices controlled by the opening of a door of the automobile for automatically releasing the slide plate, and manually operable means to permit the opening of the door without releasing the retaining means.

25. In a safety lock mechanism for automobiles a member for controlling the operation of the automobile, manually operable into "on" or running position, means normally tending to restore said member to "off" position, a segment plate associated with said member, and a key controlled segment arm to engage said plate and lock the same when said member is in "off" position.

26. In a safety lock mechanism for automobiles a member for controlling the operation of the automobile, manually operable into "on" or running position, means normally tending to restore said member to "off" position, automatically releasable means to retain said member in "on" position, and key releasable means to retain said member in "off" position.

27. In a safety lock mechanism for automobiles a member for controlling the operation of the automobile, manually operable into "on" or running position, means normally tending to restore said member to "off" position, means releasable by the opening of a door of the automobile to lock said member in "on" position, and key releasable means to lock said member in "off" position.

28. In a safety lock mechanism for automobiles, a switch controlling mechanism including a movable member, a spring to normally retain said member in one limit of its movement, manually operated means to rotatively displace said member, a spring pressed automatically releasable retaining device to hold said member in its limits of movement, and a key controlled locking device to lock said member in its initial position.

29. In a safety lock mechanism for automobiles, a switch controlling mechanism including a movable member, a spring to normally retain said member in one limit of its movement, manually operated means to rotatively displace said member, a spring pressed automatically releasable retaining device to hold said member in its limits of movement, a segment plate connected to move with said member, and a key controlled segment arm to engage and lock said plate when said plate is in its initial position.

30. In a safety lock mechanism for automobiles, a switch controlling mechanism including a movable member, a spring to normally retain said member in one limit of its movement, manually operated means to rotatively displace said member, a spring pressed automatically releasable retaining device to hold said member in its limits of movement, a segment plate connected to move with said member, and a key controlled spring pressed segment arm to engage and lock said plate in its initial position.

31. In a safety lock mechanism for automobiles, a switch controlling mechanism including a movable member, a spring to normally retain said member in one limit of its movement, manually operated means to rotatively displace said member, a spring pressed automatically releasable retaining device to hold said member in its limits of movement, a segment plate connected to move with said member, a key controlled segment arm to engage and lock said plate when in initial position, and means connected to said manually operated means to render the key controlled means inaccessible when said plate is in displaced position.

32. In a safety lock mechanism for automobiles, a switch controlling mechanism including a movable member, a spring to normally retain said member in one limit of its movement, manually operated means to rotatively displace said member, a spring pressed automatically releasable retaining device to hold said member in its limits of movement, a key controlled locking device to lock said member in its initial position, and means connected to said manually operated means to render said key controlled means inaccessible when said member is in displaced position.

33. In a safety lock mechanism for automobiles, a switch controlling mechanism including a displaceable wheel having seats or recesses in its peripheral edge, a spring pressed member to engage in said recesses or seats to retain said wheel in the respective limits of its movement, means to automatically release said retaining member, and an auxiliary key releasable locking device for said wheel.

In testimony whereof I have hereunto set my hand on this 19th day of March A. D., 1920.

HAROLD ROWNTREE.